United States Patent [19]

Melcer

[11] Patent Number: 4,751,097

[45] Date of Patent: Jun. 14, 1988

[54] METHOD OF PRODUCING LIQUID SMOKE WITH ENHANCED STAINING CAPACITY

[75] Inventor: Irving Melcer, Park Forest, Ill.

[73] Assignee: Griffith Laboratories U.S.A., Inc., Alsip, Ill.

[21] Appl. No.: 709,978

[22] Filed: Mar. 8, 1985

Related U.S. Application Data

[63] Continuation-in-part of Ser. No. 357,976.

[51] Int. Cl.$^4$ .............................................. A23L 1/221
[52] U.S. Cl. ..................................... 426/650; 426/524; 426/655
[58] Field of Search ............... 426/655, 650, 314, 431, 426/474, 524; 201/29

[56] References Cited

U.S. PATENT DOCUMENTS 3,106,473 10/1963 Hollenbeck .......................... 426/650

Primary Examiner—George Yeung
Attorney, Agent, or Firm—Michael G. Berkman

[57] ABSTRACT

A method of making improved liquid smoke products, having increased staining capability, enhanced storage stability, and a reduced concentration of materials separable upon dilution of the liquid smoke. The method effectively removes precipitable tar-like materials from liquid smoke by a prompt and rapid cooling, or "chilling," of the liquid smoke after its production, followed by timely separation of the supernatant from the precipitated phase.

2 Claims, No Drawings

METHOD OF PRODUCING LIQUID SMOKE WITH ENHANCED STAINING CAPACITY

RELATED APPLICATIONS

This application is a continuation-in-part of Melcer patent application Ser. No. 06/357,976, filed March 15, 1982, now abandoned, and the entire disclosure of that application is hereby specifically incorporated herein by reference to the extent it is not inconsistent herewith.

BACKGROUND OF THE INVENTION

The present invention relates to a method of making improved liquid smoke products. More particularly, the invention is directed to a process for effectively removing precipitable tar-like materials from liquid smoke to provide final products having enhanced flavor characteristics, and generally improved properties including increased staining capability, enhanced storage stability, and a reduced concentration of materials separable from the liquid smoke upon dilution thereof.

Liquid smoke products of the general type involved in the present invention are widely used to impart smoke flavor and smoke appearance to various food products, and to meat products in particular.

The production of smoked comestibles (for example, smoked meat) has traditionally been done by exposing the article of food to vapor smoke, produced by the burning of wood. In recent years, liquid smoke products have enjoyed considerable acceptance as a replacement for vapor smoke in the production of smoked foods. This is because liquid smoke offers many advantages over the use of vapor smoke, such as: easier application, uniformity, cleanliness, environmental and safety considerations, etc. Typically, liquid smoke has been applied to foods by a dipping or drenching operation, by vaporization or atomization of the liquid smoke into minute particles in smokehouses to simulate vapor smoke, or by addition to pumping pickles. In many of these applications, the liquid smoke is mixed or diluted with water, with or without added acidulants.

One drawback in the dilution of liquid smoke is that it contains materials which "precipitate out" on the addition of aqueous liquids. These materials are resinous or tarry in nature, and are referred to herein as precipitable solids or soluble tars. Precipitable "solids" in liquid smoke derive from the complex and highly reactive nature of the many hundreds of constituents which have been characterized in liquid smoke. Tars precipitation on dilution of the smoke with water or other aqueous liquids deters the widespread utilization of liquid smoke for the manufacture of smoked foods. Such precipitable solids may cause unsightly blotches on the smoked food, and also may clog the nozzles used in any spraying application, or the piping used in drenching applications.

Thus, it is very desirable to have liquid smoke products which would contain a minimum of such precipitable solids on dilution with water. One approach to achieving the latter goal has been the addition of "solubilizing" agents or surface active agents to the liquid smoke. It has been found that a relatively small amount of such agent added to liquid smoke effectively prevents the separation of precipitable solids when the compounded smoke is mixed with aqueous liquids. However, the surfactant is very expensive, adding significantly to the cost of liquid smoke. Further, surface active agents promote undesirable foaming of the diluted smoke, especially in drenching applications.

Liquid smoke products are manufactured commercially by aqueous counter-current extraction of vapor smoke in packed towers. Several commercial products are currently marketed under various trademarks. One such family of liquid smoke products, sold by Applicants' assignee, is marketed under the trademark, ROYAL SMOKE. The method of producing this liquid smoke is by a process described in Melcer and Sair U.S. Pat. No. 3,873,741, which is assigned to the assignee of the present invention. The entire disclosure of that patent is hereby specifically incorporated herein by reference, to the extent it is not inconsistent herewith.

SUMMARY OF THE INVENTION

The present invention constitutes a process for the treatment of liquid smoke to provide products having improved staining capability, enhanced storage stability, and a reduced concentration of materials separable from the aqueous smoke extract upon dilution.

In accordance with the method of U.S. Pat. No. 3,873,741, smoke produced by wood combustion is extracted with water in a packed tower or scrubber, maintained at an elevated temperature in the range of about 140°–180° F. The resulting "crude" liquid smoke liquor, diluted if desired, is allowed to settle for up to two weeks so as to separate a phase comprising insoluble "tars". These tars are then removed. Optionally, special additives may be incorporated in the aqueous extract (the "liquid smoke").

The temperature of the crude liquor, as freshly produced, is relatively high (160° F.–180° F.). Heretofore, it has been the accepted practice to allow the liquid smoke to "store" while cooling to ambient temperature, without interference. After a settling period, the formed precipitated tars would then be separated.

An important facet of the present invention is the discovery that it is detrimental to the quality of liquid smoke, particularly to that parameter identified as the Staining Index (correlated with the capacity of the liquid to impart a "smoked" appearance to the treated comestibles) to store or to hold the final liquid smoke product at sustained elevated temperatures, in the range from about 80° F. to about 180° F., as produced or even at room temperature in contact with precipitated solids (tars) present in the liquid.

The novelty of the present invention is predicated in part on the unexpected discovery that markedly superior liquid smoke results if the product is promptly and rapidly cooled, after it is produced, and the supernatant clear fluid is then separated from the precipitated "solids". Preferably, the cooling is carried out within about 48 to 72 hours after production of the aqueous smoke extract. The "tars" are then separated as a distinct phase. The benefits of the present invention are realized if the cooling is achieved within about 5 days after production of the aqueous extract. The accelerated cooling dispels the need to allow a one-to two-week "settling" period to effectuate phase separation of precipitated "tars". Moreover, if cooling is delayed substantially beyond a 5-day period, the quality of the product, particularly with respect to staining capacity, is markedly impaired.

The important effect of reducing the precipitatable solids content of liquid smoke was clearly demonstrated by holding the liquid smoke for two weeks in the cold, for example, at 35° F.–45° F. It was found that the resulting liquid smoke (supernatant) contained only about 77% of the amount of precipitable solids found in liquid smoke stored under ambient conditions for a similar period. That is, about 23% of the normally present precipitable solids were removed by cooling promptly, resulting in a reduced need for solubilizing agents, to effect a marked saving in product cost.

In another series of tests involving exposure of liquid smoke to various temperatures of treatment and storage, it was found that storage at 90° F. increased the residual precipitable solids; whereas, storage at 45° F. markedly reduced such precipitable solids content, as compared with liquid smoke stored at 70° F. Also, regardless of storage temperature, a chilling treatment was found to have a beneficial effect of reducing the precipitable solids. Continuous chilled storage yielded the lowest level of residual precipitable solids, and liquid smoke products having enhanced staining capacity.

The studies carried out establish that chilling of liquid smoke results in markedly improved products. The following relevant facts are pertinent:

(a) precipitable solids accumulate (form) in the supernatent phase in liquid smoke, as a function of time and temperature;

(b) the accumulation of precipitable solids is more rapid at higher storage temperatures.

(It is presently postulated that the precipitable solids represent an intermediate stage in the deposition of insoluble tars in the liquid smoke storage containers. The precipitable solids are believed to increase to a value where their concentrational level exceeds their solubility in the liquid, whereupon the solids precipitate.)

(c) early chill treatment of the liquid smoke is beneficial in that it effects prompt separation of excess precipitable solids from the aqueou extract. These solids are then discardable to ensure that the liquid smoke remains homogeneous and that the final shipping containers containing the liquid smoke remain free of precipitated tars for a significantly longer time period;

(d) pre-chilling not only minimizes unsightly deposition of tars in storage drums, but helps prevent the inadvertent undesirable and objectionable deposits of tars on meat and other food products during processing;

(e) pre-chilling reduces the concentration of soluoilizing agent required in "soluble smoke" products, thereby significantly reducing the cost of this type of liquid smoke.

(f) Early chilling of the liquid smoke provides a liquid smoke product which is less prone to become cloudy on water dilution. Also, from a temperature standpoint, the improved product also exhibits a lowered "cloud point";

(g) pre-chilling of liquid smoke promptly to effect removal of precipitable solids including "tars" provides a final product having a significantly increased, and stabilized "staining index" correlated with an enhanced capability of the liquid smoke to impart "smoke color" to treated comestibles. The effect is believed to be due to the cooling having a stabilizing or preserving effect on carbonyl compounds contained in the liquid smoke. Experimental evidence supports the belief that the carbonyls are the primary chemical agents responsible for the meat-coloring capability, or the very important staining power of liquid smoke;

(h) a critical feature of the method of the invention is that the chilling of the liquid smoke must be carried out promptly after production of the aqueous extract. The word "promptly" a used herein means within about 5 days, but preferably within 48–72 hours. The temperature of the extract should preferably be brought down to about 60° F., or lower.

DETAILED DESCRIPTION OF THE PREFERRED METHODS

The aims, objects and advantages of the present invention are achieved by promptly and effectively significantly cooling commercially produced liquid smoke upon the recovery and isolation thereof from the extraction system. The cooling is to a temperature below about 60° F. and is carried out within about 5 days and preferably within 48 to 72 hours of production. The supernatant clear liquid is then separated from the precipitated tar-like phase which forms during the cooling period.

One early realization that elevated storage temperatures have adverse effects on the quality and also increase the cost of liquid smoke was the discovery that increased quantities of added surfactants were required to ensure solubilization of liquid smoke produced during summer months as compared with liquid smoke manufactured during the winter season. (It has been the practice of Applicant's assignee to add special solubilizing agents to their commercial liquid smoke to prevent solids precipitation and to prevent "throw out" or phase separation in the liquid smoke upon aqueous dilution.) In investigation researchers carried out it was found that supernatants of liquid smoke stored out of doors for two weeks in the summer contained increased levels of total and soluble "tars" and required more surface active agents or solubilizing agent than did the supernatants of duplicate samples kept refrigerated for the same time period.

In a controlled investigative program, the following facts were established regarding liquid smoke;

(a) chilling or subjecting the final aqueous extract (liquid smoke) to lower temperatures produced cloudiness and phase separation.

(b) continuous refrigerated storage produced the lowest concentrations of total and precipitable solids in the treated liquid smoke and a lessened need for solubilizing agents.

(c) A "final" chill treatment prior to final processing, regardless of storage temperature history, reduces the concentration of precipitable solids contained in the resulting liquid smoke.

(d) an initial chilling, without then carrying out a phase separation (to remove precipitated tars), but followed by storage at "summer conditions" still produced high total and precipitable solids and an increased requirement for solubilizing agents.

(e) high storage temperature for the aqueous extract reduced the commercially important staining power of the liquid smoke product.

In accordance with the practice of the present invention, it has been found (1) that high temperature storage is deleterious to liquid smoke quality, (2) that the noted adverse effects cannot be remedied by initial cooling alone, and (3) that one can avoid the increased solids content and the related need for increased concentrations of solubilizing agents by cooling the liquid smoke after storage—immediately before further processing.

(The present invention is predicated on the surprising discovery of the unexpected advantages and the commercially significant improvements in the liquid smoke to be achieved by promptly cooling the liquid smoke, immediately, after its production. This critical fortuitous discovery, the essence of the present invention, is described in a latter part of this specification.)

Another stage in the development of the present invention was a controlled study of the effect of extended storage of liquid smoke at several different temperatures including at 40° F., at 70° F. (essentially "room temperature") and at an elevated temperature (100° F.). Typical results, as set forth in TABLE I below, establish the beneficial effects of chilled storage conditions in protecting the staining power (the ability of the smoke to impart smoke color appearance to food products) of the liquid smoke.

Low storage temperatures (40° F.) retarded the development of precipitable solids, and facilitated the separation of excess precipitable solids. It was found that even a brief exposure to 40° F. temperature would produce beneficial effects (e.g. stabilization of staining power). These effects were retained in subsequent processing, even should the liquid smoke be subsequently exposed to ambient storage conditions, i.e., at about 70° F.

The present invention of purposefully and promptly markedly cooling the liquid smoke, upon production, was found to obviate deleterious thermal effects associated with inherent processing conditions ordinarily existent when following prior art manufacturing techniques. For example, the hot (160° F.-180° F.) crude liquor, when permitted to cool "naturally", without assistance, would ordinarily not reach ambient conditions, e.g., 70° F. for possibly up to two weeks or longer. Such extended "temperature-elevated" storage has now been shown to effect permanent and irreversible deterioration of the liquid smoke product. The temperature effects noted above for the liquid smoke of Applicant's assignee were also found upon testing competitive products.

Some of the significant quality-affecting changes in the parameters of liquid smoke, as a function of extended storage at various temperatures (40° F., 70° F. and 100° F.) are set forth in the following tabular summarization (TABLE I).

comparable changes of the same key parameters, as a function of time and temperature.

All samples stored at 40° F. exhibited a stable Staining Index over a 12 months storage period. However at 70° F. storage the Staining Index value dropped to about 85% of original values. At 100° F. storage the Staining Index values had dropped below 90% in from 4 to 6 months and to about 70% in 12 months. The Staining Index is presently considered to be the most important single "property" of liquid smoke.

In all brands tested total acidity increased in the range of from about 5–13% upon storage for one year at room temperature. Total solids increased 34–43%, precipitable solids (soluble solids which precipitate upon dilution of the liquid smoke with two volumes of water), increased by 62–88%, and color values more than doubled. At the same time, phenols dropped 7–23%, and carbonyls dropped 7–19% roughly paralleling the loss in Staining Index.

All changes noted at room temperature (70° F.) were greatly accelerated at 100° F., with associated deterioration of smoke quality. In particular, total and precipitable solids increased 2–6 fold and the liquid smoke darkened markedly (a 4- to 8-fold increase in color value). Carbonyl concentrations decreased significantly.

While, as indicated, the quality of liquid smoke is impaired least if stored at lower temperatures (e.g., 40° F.), incipient increases in total solids (23%), precipitable solids (39–72%), and in color value (35–50%) are evident.

In addition to the effects on the liquid smoke discussed above, the extent to which "tars" deposited on walls and on the bottom of the storage containers increased appreciably with increase in storage temperature. Upon one year's storage, 10–20% of the container surface was coated at 40° F. storage, 20–60% at 70° F. storage, and 30–80% at 100° F. storage.

Analysis of liquid smoke manufactured throughout the year showed that the concentration of soluble tars (precipitable solids) contained in the product varied seasonally, that is, with temperature. In a related study

TABLE I

STORAGE STABILITY OF LIQUID SMOKE

| Storage Temp. (F.) | Time (Mos.) | Acidity | Solids | | Color Value | Phenols | Carbonyls | Reference Staining Index |
| | | | Total | Pptble | | | | |
| | | | (PERCENT OF ORIGINAL ANALYSIS) | | | | | |
| 40 | 12 | 102 | 123 | 139 | 150 | — | 95 | 98 |
|  | 12 | Incr. | Incr. | Incr. | Incr. | Decr. | Decr. | Decr. |
| 70 | 12 | 105 | 141 | 162 | 212 | 77 | 81 | 85 |
| 100 | 12 | 162 | 237 | 625 | 460 | — | 73 | 73 |

The data establish that upon storage at 40° F. the liquid smoke is stable. At 70° F. storage the product exhibits reduced stability. Upon storage at 100° F., product stability is clearly impaired. Among key indicators of liquid smoke quality are the following:

Staining, or Staining Index which measures the coloring power,

Phenols, which reflect flavor strength, and

Carbonyls, which are a secondary indicator of coloring or staining capacity.

The above set forth data derive from tests carried out on 31 samples using three different "codes" of liquid smoke sold commercially by Applicant's assignee. Additional studies were made on two other brands (competitors' liquid smoke), which were found to undergo involving liquid smoke made during the "hotter" months, it was found that cooling was effective to reduce the concentration of precipitable solids in the range of from about 13 to 50% to meet predetermined specifications. The beneficial effects of chilling were found to exist regardless of the strength or "grade" of the smoke product involved In subsequent controlled laboratory experiments it was established that the desired precipitation of soluble Q tars Was optimally carried out by chilling the liquid smoke to about 45° F., although good results were achieved within a cooling range of from about 60° F. to temperatures short of causing freezing.

The technique, in laboratory procedures, was to cool the liquid smoke to the desired temperature, and to maintain that temperature for an additional holding period of 30 minutes The cooled samples were then centrifuged to remove th cold-precipitated tars, and the residual soluble tars were determined by analysis of the supernatant The rapid, short-duration cooling was found to be comparable in tar removal effectiveness to what was achieved in extended: multiple-day cooling in refrigeration studies. From about 14% to about 40% of precipitable tars was removed.

The separation of soluble tars, removable through the use of the cooling process of the present invention was found to be a method applicable to all liquid smokes studies. It was found that, in general, the total of such precipitable tars increases with liquid smoke strength (i.e., with increase in the Staining Index and the acid concentration of the liquid smoke), but not proportionally to the initial tar content. Therefore, on a percentage basis, the effectiveness of tar removal has been shown to be, in the practice of the present invention, relatively greater for "weaker" smokes. For the highest strength liquid smoke about 15% of the total tars content can be removed by chilling. For two successively lower strength products. about 20% and about 40%, respectively, of total tars were removable.

The physical removal of settled or precipitated tars may be effected by any preferred technique, including centrifugation, filtration, pumping or decantation of the supernatant, or discharge of the tars from a settling tank through controlled valving and pumping. Such separation is carried out prior to packaging the liquid smoke in the "final" container. It has been found that failure physically to remove the separated solids permits such solids to redissolve, thus negating at least partially, the benefits of chilling.

In further exploration of the facets of the present invention, the chilling process was adapted to commercial liquid smoke production.

Fresh crude liquor was allowed to settle overnight, during which time the temperature dropped to approximately 120° F. from its process temperature of 160° F.–180° F. After removing the settled tars, the partially clarified liquor was pumped into a 6000 gallon tank equipped with cooling coils cooled by recirculating chilled water from an external 30 H.P. refrigeration unit. It was found that 4000 gallons of liquid smoke can be cooled from 120° F. to 50° F. by exposure to the cooling coils for approximately 19 hours. The appearance and the color-imparting capacity of the chilled smoke were much better after this treatment than after the usual 10 to 14 day settling time without chilling. The value of the chilling process was clearly proven in commercial operation. The Color Value, precipitable solids content, and most importantly, the Staining Index of the chilled smoke are improved over that of prior processes.

Conceivably, it might be assumed that in the customary and ordinary traditional manufacture and storage of liquid smoke, the product may, inherently or fortuitously. have been "subjected" to low temperature treatment. for example, during winter months. However, any such "cooling" would fall substantially short of invoking the benefits of the present invention. For example, any tar-like material precipitated upon storage in drums or other containers, and not removed, would remain as objectionable tars and would constitute a probable contaminant of the comestibles treated with the liquid smoke. In contrast, in the practice of the present invention, the timely cooling of the liquid smoke to sub ambient temperatures (60° F., or lower) is promptly followed by physically removing the contaminating "cold-insoluble" precipitated material. Accordingly, the final treated, packaged liquid smoke of the present invention has a significantly reduced level of both tars and precipitable solids, as compared even with any merely "cooled" liquid smoke. Possible contamination of liquid-smoke-treated food products is prevented and stability of the liquid smoke itself is greatly enhanced.

A marked and perhaps the commercially most important improvement realized in the practice of the present invention is a commercially-significant increase in the Staining Index of the liquid smoke. Other parameters affected include Color Value and Precipitable Solids. Each of the latter two is reduced by early chilling of the liquid smoke followed by promptly separating the clear supernatant from the precipitated thicker or tar-like phase.

In analyzing numerous samples of each of four different grades or "strengths" of the commercial liquid smoke of Applicant's assignee, it was unexpectedly found that the method of the invention provided products having significantly increased Staining Index, as compared with prior commercial products. In the case of the most concentrated liquid smoke product, the Staining Index was increased about 10%; for the second grade, about 7%; for the third grade, about 7%. and for the most dilute grade, over 20%.

Upon averaging the calculated Staining Index at a fixed (12%) acidity for crude liquid smoke samples under the same processing conditions but omitting the rapid cooling and phase separation steps of the invention, no variations in Staining Index were found. These results further confirmed that the Staining Index improvements of the present invention are keyed to the early cooling step of the invention.

In further studies it was found that the chilling process of the invention is effective to preserve almost the full original staining power of liquid smoke, making feasible an upgrading of the liquid smoke products themselves, at least one "code" grade.

Tests to determine Precipitable Solids, with and without the "quick-cooling" innovation of the invention were carried out on three different "codes" of assignee's liquid smoke. produced commercially. Measurements were "averaged". It was found that the use of the early "cooling" step reduced the precipitable solids in the supernatant liquid smoke, retarded deposition of insoluble tars in the storage containers, and reduced the requirements for solubilizing agents in "soluble" smokes.

One might query whether the enhancement of the desirable properties and of the stability of the liquid smoke found to result upon cooling liquid smoke promptly after produced (post extraction chilling) might not be achievable as well by cooling the liquid smoke during production, that is, during the extraction process itself (in-process chilling). A method of manufacturing liquid smoke which includes such "in-process" cooling is described in the patent literature.

Based on a study of commercially available liquid smoke products including products believed to have been produced utilizing in-process chilling, it was concluded that the liquid smoke product resulting from cooling conducted during the extraction includes higher concentrations of objectionable lower boiling constituents and has a flavor inferior to that of the products produced in accordance with the method of the present invention which utilizes high temperature (preferably 160°-180° F.) extraction followed by cooling promptly after completion of the extraction operation (post-extraction chilling).

It was conclusively established that cooling during the extraction process adversely affected the properties of liquid smoke. This fact is corroborated in carefully conducted studies relevant details of which are set forth below. Extractions carried out in the temperature range of 40°-140° F. leave objectionable levels of undesirable volatile components, resulting in a more reactive smoke product having poorer flavor. Nor is any desirable property of such in-process cooled liquid smoke improved over the high temperature extraction (150° F. and higher), post-extraction, prompt-cooling method of the present invention.

The data set forth below establish that at lower extraction temperature ranges, up to about 140° F., and especially in the temperature range of 70°-120° F. (or 60°-80° F.) suggested in the prior art, there is significant retention of undesirable volatiles such as acetone and methanol. Moreover, the benefits of effecting higher temperature polymerization and condensation of resinous and other relatively reactive constituents to allow their subsequent removal prior to packaging are not realized (see Table III). Such reactions would occur in the final container leading to tar deposition with all the resulting end-use drawbacks previously described. All of the experimental evidence supports the fact that extractions conducted at the higher temperatures (at about 150° F. and higher) produce liquid smoke products having taste greatly superior to that of the products produced at lower temperature (in-process cooled) extractions, including at the "preferred" 70°-120° F. range of the prior art.

It is to be understood that the lower temperature extractions are carried out by cooling the liquid smoke during the recirculating extractive process (in-process chilling). This positive cooling prevents the complex reaction and extraction system from reaching the critical higher temperatures needed to produce superior extracts characterized by reduced concentrations of objectionable lower boiling contaminants.

Moreover, the positive and continuous chilling procedures which are required to assure effective "in-process" cooling are expensive. The cost of the final product is markedly increased without any concurrent or compensating benefit. Rather, the resulting liquid smoke has been found to be clearly inferior in flavor to the high temperature extraction products in which there is no positive cooling during extraction.

These facts have been established by carefully controlled objective taste tests. A taste panel characterized the liquid smoke produced without resort to "in-process" cooling as "cleaner" in flavor, fresher, less harsh, less "alcoholic", less intense, and less tar-like than the product produced by "in-process" cooling during extraction.

Details of experiments conducted to compare liquid smoke produced with and without in-process cooling are described in the following pages.

APPARATUS EMPLOYED

An all-glass laboratory smoke generator was fabricated essentially to duplicate the Liquid Smoke generation system described in U.S. Patent 3,873,741, being generally the method with respect to which the subject invention (of prompt cooling production) is an improvement. It consisted of a pyrolysis chamber or reactor which was a horizontally-placed glass cylinder 7 cm. Dia.×30 cm. long (2.75 in.×12 in.). It was spirally wound with 0.75 mm (0.03 in.) Nichrome wire connected to a powerstat for heating. The sawdust was packed in the chamber to convert it to charcoal and generate smoke vapors for production of Liquid Smoke. One end of the chamber contained an opening for introducing over the sawdust bed a measured amount of air via a rotometer to provide the aeration parameters of Applicants' prior U.S. Pat. No. 3,873,741. The other end was attached via a short glass tube to the absorption column, which consisted of a vertical cylinder 7 cm. Dia.×40 cm high (2.75 in.×16 in.). The absorption column was packed with 3 mm Dia. glass beads.

The absorption column was placed over and discharged into a 600 ml beaker, jacketed for temperature control. Either ice water or water heated to 80° C. (176° F.) in a water bath was circulated through the jacket of the recycle beaker to maintain either cold or hot absorption conditions. The contents of the recycle beaker were pumped to the top of the absorption column by means of a suitable pump. The exhaust (unabsorbed) vapors exited from the top of the absorption column via Tygon tubing into a trap maintained at a temperature of $-54°$ C. ($-65°$ F.) by immersion in a dry ice/propylene glycol bath. This trap was connected to a vacuum pump to provide the driving force for the travel of the smoke vapors through the system. A negative pressure of 0.5-2.0 in. of water was maintained in the system.

The temperature profile of the system was measured by means of thermocouples placed within the sawdust bed in the reactor, in the duct from the reactor to the absorption column, in the recycle beaker, and imbedded in the wall at the top and bottom of the absorption column. These thermocouples were connected to suitable devices for reading and recording the temperatures.

Several series of experiments were run generating Liquid Smoke under hot and under in-process cooled absorption or extraction conditions. To begin a series, the recycle beaker was charged with a minimum amount of water (about 225 ml.) to maintain adequate recycle rate (200 ml/min) and a flooded condition in the absorption column. A charge of hickory sawdust dried to 1.5-2% moisture and amounting to 260-318 gm/run was placed in the pyrolysis chamber. After establishing temperature equilibrium by recirculating hot (or cold) water through the jacket of the recirculating beaker, pyrolysis of the sawdust was started by applying heat through the Nichrome wire, at the same time adding positive air as described above. Duration of the run was 1 hr., during which time air equivalent to 2.7 cu.ft/lb. of sawdust (76,400 ml/454 gm) was applied. At the completion of a run and after cooling the system, the amount of charcoal remaining in the reactor was weighed, and the amount of crude Liquid Smoke in the recycle beaker was also weighed, after separating the tars which precipitated. The exhaust vapor condensate was also measured by weighing the trap at the completion of each run. Since a single run did not produce Liquid Smoke of the required strength (above 7% acidity), a portion of the generated crude Liquid Smoke was employed for a subsequent run. This was repeated until desired strength was achieved.

From 3-8 runs ("recycles") were required to obtain Liquid Smoke of the proper strength. The condensate obtained in the cold trap was maintained throughout a series of runs, being transferred from run to run so as to obtain a quantitative collection of all of the condensate produced for each set of conditions. Two series of runs were carried out employing cold absorption conditions (in-process cooling) and two additional series were carried out employing hot absorption conditions.

Analysis of the Liquid Smokes produced and of the exhaust condensates was carried out employing standard analytical techniques: total acidity by titration; total solids by oven drying; precipitable solids by aqueous dilution, isolation of precipitated material. and oven drying; phenols by the Gibbs procedure; staining index by reaction with glycine and measurement of the color produced using a spectrophotometer; color value by the use of an appropriate photometer; specific gravity by Westphal balance, pH by pH meter. In addition, analysis of volatile materials trapped in the Liquid Smoke and condensate fractions was done by chromatographic techniques. The acetone and methanol were determined by gas chromatography employing a 20% carbowax 20 M column.

RESULTS

Tables II through IV summarize the results obtained.

Table II details the processing conditions and yields of charcoal and condensate obtained. Under cold absorption or extraction conditions, temperatures in the range of 50°–80° F. were maintained in the recycle beaker and absorption column.

For the hot absorption runs temperatures in the range of 140°–166° F. were maintained in the system using the 176° F. circulating water.

TABLE II
LABORATORY PRODUCTION OF LIQUID SMOKE WITH COLD AND HOT EXTRACTION

|  | COLD | | HOT | |
| --- | --- | --- | --- | --- |
|  | Series I | Series II | Series I | Series II |
|  | Number of Runs | | | |
|  | 4 | 8 | 3 | 1 |
| Temperatures, °F.: | | | | |
| Recycle Beaker | 66–80 | 63–70 | 140–156 | 166 |
| Absorption Column | 63–80 | 50–56 | 145–166 | 158 |
| Smoke Vapor | 400+ | 400+ | 400+ | 400+ |
| Pyrolysis Bed Sawdust | 575–765 | 590–810 | 685–803 | 630 |
| Gms per Run | 260–318 | 275–315 | 275 | 275 |
| Gms Total | 1098 | 2320 | 825 | 275 |
| Charcoal, % of Sawdust | | | | |
| Average | 31.9 | 33.7 | 34.1 | 34.8 |
| Range | 30.4–34–3 | 31.5–35.4 | 33.0–35.7 | — |
| Exhaust | | | | |

TABLE II-continued
LABORATORY PRODUCTION OF LIQUID SMOKE WITH COLD AND HOT EXTRACTION

|  | COLD | | HOT | |
| --- | --- | --- | --- | --- |
|  | Series I | Series II | Series I | Series II |
|  | Number of Runs | | | |
|  | 4 | 8 | 3 | 1 |
| Condensate: | | | | |
| Gms per Run | 4.0 | 3.2 | 13.7 | 12.1 |
| Gms Total | 16.1 | 26.0 | 27.5 | 12.1 |

TABLE III
ANALYSIS OF LIQUID SMOKES PRODUCED WITH COLD AND HOT EXTRACTION

|  | COLD | | HOT | |
| --- | --- | --- | --- | --- |
|  | Series I | Series II | Series I | Series II |
| Total Acidity as HAc, % | 8.8 | 7.3 | 7.6 | 2.8 |
| Total Solids, % | 4.5 | 4.6 | 5.0 | 2.1 |
| Precipitable Solids, % | 0.1 | 0.3 | 0.2 | 0.1 |
| Phenols as 2,6-DPM, mg/ml | 13.9 | 10.9 | 9.4 | 4.5 |
| Staining Index | 42 | 50 | 49 | 15 |
| Color Value, 1:10 | 40 | 36 | 42 | 6 |
| Specific Gravity | 1.060 | 1.052 | 1.057 | — |
| pH | 2.3 | 2.4 | 2.3 | 2.6 |
| Acetone % | 0.6 | 0.5 | 0.1 | 0.1 |
| Methanol, % | 2.2 | 3.9 | 1.1 | 1.0 |
| Tar of Crude Liquid (%, Average) |  | 2.4 (60–80° F.) | 3.3 (140–160° F.) | only a single run involved |

TABLE IV
ANALYSIS OF EXHAUST VAPOR CONDENSATES PRODUCED WITH COLD AND HOT EXTRACTION

|  | COLD | | HOT | |
| --- | --- | --- | --- | --- |
|  | Series I | Series II | Series I | Series II |
| Total Acidity as HAc, % | 4.9 | 2.4 | 2.2 | — |
| Phenols as 2,6-DMP, mg/ml | 1.59 | 3.60 | 0.72 | 1.06 |
| Staining Index | 10 | 5 | 4.5 | — |
| Acetone, % | 0.9 | 0.8 | 2.3 | 2.2 |
| Methanol, % | 2.0 | 2.1 | 9.2 | 6.7 |
| MATERIAL BALANCE | | | | |
| Sawdust used, Gm | 1098 | 2320 | 550 | 275 |
| Condensate produced, Gm | 16.1 | 26.0 | 27.5 | 12.1 |
| Acetone, mg | 145 | 208 | 633 | 266 |
| Acetone, mg/100 gm sawdust | 13.2 | 9.0 | 115.1 | 96.7 |
| Methanol, mg | 322 | 546 | 2530 | 811 |
| Methanol, mg/100 gm sawdust | 29.3 | 23.5 | 460 | 295 |
| Phenols, mg, | 25.6 | 93.6 | 19.8 | 12.8 |
| Phenols, mg/100 gm sawdust | 2.3 | 4.0 | 3.6 | 4.7 |

Temperatures in the pyrolysis bed and in the smoke vapor generated were similar for all four series of runs. Likewise, the percent of charcoal produced as a fraction of the sawdust employed was relatively constant for all four series of runs, indicating that the same extent of carbonization was achieved and therefore eliminating this as a possible source of variation. Finally, the total amount of exhaust condensate recovered for each series is detailed in the table. It is evident that 3–4 times as much condensate was collected under hot extraction conditions as compared to the cold conditions. This simply means that the water vapor is more volatile at higher temperatures, thus escaping the absorption column and reaching the −65° F. trap for collection.

Table III sets forth details of the analysis of the Liquid Smoke produced in the four series of runs. With the exception of the second series of hot runs, the strength of the Smoke produced was 8.5–9% acidity, corresponding to a commercial liquid smoke marketed by applicant's assignee. Since only one run was employed in the second series of hot runs, the acid content was much lower. The other analytical parameters examined are unremarkable and typical of the commercial product referred to. Staining index values and phenol levels were typical of the same commercial product and not significantly different in the hot and cold extraction series, when related to the overall strength (acidity) of the smoke produced. However, there is a clear-cut difference in the content of volatile materials of the Liquid Smokes produced under each set of conditions. The cold absorption smokes contained 5–6 times as much acetone and 2–4 times as much methanol as the Liquid Smokes produced with hot absorption or extraction. That is, at higher temperatures, the volatile materials escape the absorption column and as shown below are collected in the cold exhaust vapor trap. Also, at the higher absorption temperatures the percent tars separated was significantly greater, indicating enhanced polymerization and condensation of resinous material.

Table IV gives the analytical data for the exhaust vapor condensates generated in the four series of runs. Condensates produced under cold extraction (in-process cooling) conditions contain higher levels of acidity and phenols than those produced under hot absorption conditions. The opposite is true for the more volatile components such as acetone and methanol, where the hot absorption condensates contain considerably more of these components than the condensates produced by cold absorption.

Since the exhaust vapor condensates were carried throughout all of the runs comprising a series, intact, it is possible to establish a material balance or relationship between the condensate components and the total sawdust processed. This is done in the material balance section of Table IV. Expressed on the basis of mg. of volatile component recovered per 100 gm. of sawdust carbonized, the acetone collected under hot absorption conditions amounts to 10 times as much as that collected under cold extraction conditions. Similarly, the methanol quantities recovered in the condensate are 10–20 times as much. In contrast, the levels of phenolic components lost in the unabsorbed exhaust condensate amount to only 1.2–1.5 times as much under hot as compared to cold extraction. This is because the phenols are less volatile than the other components studied, and, therefore, are not as affected by extraction temperature conditions insofar as the partition between quantities absorbed in the Liquid Smoke fraction and those lost in the unabsorbed exhaust condensate.

FLAVOR EVALUATION

In order further to establish the differences between Liquid Smokes produced by hot and cold extraction, flavor evaluation was performed on the Liquid Smokes produced in the cold extraction series II and hot extraction series I. As Table III shows, these Smokes were quite comparable in their analytical parameters. Flavor evaluation was done by tasting a dispersion of 40 mg. of Smoke per 100 ml of a "soup" consisting of 4% wheat flour and 0.8% salt. 16 of 20 tasters were able to discern a difference between the cold extracted Smoke and that produced under hot absorption conditions. The comments were that the cold extracted Smoke which contained a higher level of volatiles had a harsher, stronger, more tar-like or not as "clean" a flavor as the Smoke produced by hot absorption. The latter was characterized as being fresher, less alcoholic and less intense. This clearly shows that the high levels of volatiles adversely affect the flavor of the cold extracted Smoke.

SUMMARY

The reported investigation clearly shows that there are important, differences in the volatiles content of Liquid Smoke produced, depending on the temperature of extraction of the vapor in the countercurrent circulating liquid. Under hot extraction conditions approaching those of Applicant's preferred commercial method, a cleaner, better tasting Liquid Smoke is produced which is lower in undesirable volatiles. These volatiles, primarily acetone and methanol, are separated from the liquid smoke when higher extraction temperatures are used. Under cold extraction conditions such as extract for "in process" cooling, a harsher, more alcoholic tasting Smoke is produced which is high in the undesirable volatile components.

It has further been demonstrated that "in-process" cooling is prohibitively expensive, with no justifying benefit. Moreover, the flavor of the resulting liquid smoke is inferior to that obtained using the high temperature extraction method of Applicant's improved process.

What is claimed is:

1. In the method of producing a liquid smoke product for use in imparting a wood-smoke-stained appearance and a wood-smoke taste to comestibles treated with said product, which method includes the steps of:
    heating wood in a chamber in the presence of an oxygen-controlled atmosphere so effect thermal decomposition of the wood and to generate smoke,
    contacting said smoke with water to provide an aqueous extract of said smoke,
    maintaining the water at a temperature in the range of about 150° to 180° F. during contact with the smoke for reducing concentrations of objectionable volatiles including acetone and methanol in the aqueous extract, and
    isolating said aqueous extract,
    the improvement comprising:
    the steps, subsequent to isolation of the aqueous extract of
    cooling the isolated said aqueous extract to a temperature below 60° F. within five days of having produced said aqueous extract, to precipitate a phase insoluble in said aqueous extract,
    removing said phase from contact with said aqueous extract to provide a residual aqueous liquid smoke product exhibiting an improved staining index and enhanced storage stability, and having a reduced concetration of materials which are separable from said aqueous extract upon subsequent dilution thereof.

2. In the method of producing a liquid smoke product for use in imparting a wood-smoke-stained appearance and a wood-smoke taste to comestibles treated with said product, which method includes the steps of:
    heating wood in a chamber in the presence of an oxygen-controlled atmosephere to effect thermal decomposition of the wood and to generate smoke,
    contacting said smoke with water to provide an aqueous extract thereof, maintaining the extract at a temperature in the range of about 150° to 180° F. during contact with the smoke for reducing concentrations of objectionable volatiles including acetone and methanol in the aqueous extract, isolating said aqueous extract, and separating from said aqueous extract water-insoluble components, the improvement comprising:

the steps, subsequent to isolation of said aqueous extract and subsequent to separation of said water insoluble compounds therefrom, of cooling the isolated said aqueous extract to a temperature below 60° F. within five days of having produced said aqueous extract, to precipitate a phase insoluble in said aqueous extract, removing said phase from contact with said aqueous extract to provide a residual aqueous liquid smoke product exhibiting an improved staining index and enhanced storage stability, and having a reduced concentration of materials which are separable from said aqueous extract upon subsequent dilution thereof.

* * * * *